(12) United States Patent
Garfinkel et al.

(10) Patent No.: US 9,738,176 B2
(45) Date of Patent: Aug. 22, 2017

(54) BATTERY PACK THERMAL MANAGEMENT

(71) Applicant: FORD GLOBAL TECHNOLOGIES, LLC, Dearborn, MI (US)

(72) Inventors: George Albert Garfinkel, Westland, MI (US); Neil Robert Burrows, White Lake Township, MI (US); Chung-hsing Kuo, Ann Arbor, MI (US); Steve F. Chorian, Canton, MI (US); Dhanunjay Vejalla, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/233,372

(22) Filed: Aug. 10, 2016

(65) Prior Publication Data

US 2016/0347198 A1    Dec. 1, 2016

Related U.S. Application Data

(63) Continuation of application No. 14/537,243, filed on Nov. 10, 2014, now Pat. No. 9,440,555.

(51) Int. Cl.
*B60L 11/00* (2006.01)
*B60L 11/18* (2006.01)
*B60K 11/06* (2006.01)

(52) U.S. Cl.
CPC .......... *B60L 11/1874* (2013.01); *B60K 11/06* (2013.01); *B60L 11/1875* (2013.01); *Y02T 10/7005* (2013.01)

(58) Field of Classification Search
CPC   B60L 11/1851; B60L 11/187; B60L 11/1874; B60L 11/1875; B60K 2001/0438; B60K 2001/0433; B60K 2001/0422; B60K 2001/0411; B60K 1/04
See application file for complete search history.

(56) References Cited

U.S. PATENT DOCUMENTS

| 2,104,770 A | 1/1938 | Saunders |
| 2,717,045 A | 9/1955 | Nallinger |
| 4,135,593 A | 1/1979 | Fowkes |
| 5,320,190 A | 6/1994 | Naumann et al. |

(Continued)

FOREIGN PATENT DOCUMENTS

| EP | 2340951 | 6/2013 |
| FR | 2890908 | 3/2007 |

(Continued)

OTHER PUBLICATIONS

Gordeon-Bloomfield, Nikki. Does Nissan E-NV200 Show Change of Policy on Battery Heating, Cooling?, Jun. 12, 2014. Retrieved on Sep. 1, 2014 at http://transportevolved.com/2014/06/12/nissan-e-nv200-show-change-policy-battery-heating-cooling/.

*Primary Examiner* — Frank Vanaman
(74) *Attorney, Agent, or Firm* — Carlson, Gaskey & Olds, P.C.

(57) ABSTRACT

An assembly includes a traction battery of an electrified vehicle, and a blend door moveable between a first position that permits a first flow of air to move toward the traction battery and a second position that permits a second flow of air to move toward the traction battery. The first flow includes more air that has moved through an engine compartment than the second flow.

13 Claims, 6 Drawing Sheets

(56) References Cited

U.S. PATENT DOCUMENTS

| | | | |
|---|---|---|---|
| 5,490,572 A | 2/1996 | Tajiri et al. | |
| 5,542,489 A | 8/1996 | Allison et al. | |
| 6,335,116 B1 * | 1/2002 | Yamane | B60L 11/1874 |
| | | | 429/120 |
| 7,353,900 B2 | 4/2008 | Abe et al. | |
| 8,517,132 B2 | 8/2013 | Heichal et al. | |
| 2004/0065491 A1 | 4/2004 | Dudley et al. | |
| 2006/0048984 A1 * | 3/2006 | Pleune | B60K 11/04 |
| | | | 180/68.4 |
| 2009/0071178 A1 | 3/2009 | Major et al. | |
| 2009/0176150 A1 * | 7/2009 | Yanaka | B60H 1/00278 |
| | | | 429/120 |
| 2010/0116568 A1 * | 5/2010 | Kadoi | B60H 1/00278 |
| | | | 180/65.1 |
| 2010/0163322 A1 * | 7/2010 | Stefani | B60L 11/005 |
| | | | 180/65.21 |
| 2013/0025953 A1 * | 1/2013 | Saeki | B60L 11/1874 |
| | | | 180/68.5 |
| 2013/0143083 A1 | 6/2013 | Utley et al. | |

FOREIGN PATENT DOCUMENTS

| | | |
|---|---|---|
| FR | 2988522 | 9/2013 |
| JP | 11178115 | 7/1999 |
| JP | 11001126 | 7/2000 |
| JP | 2004235075 | 8/2004 |
| JP | 2013171662 | 9/2013 |
| WO | 2014102848 | 7/2014 |

\* cited by examiner

| | WEATHER | DRIVE CYCLE | ENGINE TEMPERATURE | BATTERY TEMPERATURE | BLEND DOOR POSITION | BLOCKER DOOR POSITION |
|---|---|---|---|---|---|---|
| CONDITION SET I | COLD | MILD OR AGGRESSIVE | COLD TO WARM (START & WARM UP) | COLD | FIRST POSITION | FLOW-PERMITTING |
| CONDITION SET II | COLD | MILD | WARM TO HOT | COLD (LOW SELF-HEATING) | FIRST POSITION | FLOW-PERMITTING |
| CONDITION SET III | COLD | AGGRESSIVE | HOT | WARM TO HOT | INTERMEDIATE POSITION | FLOW-PERMITTING |
| CONDITION SET IV | COLD | ELECTRIC | COLD | COLD TO WARM | FIRST POSITION | FLOW-BLOCKING |
| CONDITION SET V | COLD | ON-PLUG | COLD-OFF | COLD | ANY POSITION | FLOW-BLOCKING |
| CONDITION SET VI | COLD | ON-PLUG OR PARKED | WARM AFTER DRIVE | WARM AFTER DRIVE | FIRST POSITION | FLOW-BLOCKING |
| CONDITION SET VII | COLD | IDLING, PARKED OR ON-PLUG | WARM TO HOT | COLD | FIRST POSITION | FLOW-PERMITTING |
| CONDITION SET VIII | MILD | MILD | WARM | WARM | INTERMEDIATE POSITION | FLOW-PERMITTING |
| CONDITION SET IX | MILD | AGGRESSIVE | HOT | WARM TO HOT | SECOND POSITION | FLOW-PERMITTING |
| CONDITION SET X | MILD OR HOT | ELECTRIC | COLD | WARM TO HOT | INTERMEDIATE POSITION | INTERMEDIATE POSITION |
| CONDITION SET XI | HOT | MILD OR AGGRESSIVE | WARM TO HOT | WARM TO HOT | SECOND POSITION | FLOW-PERMITTING |
| CONDITION SET XII | HOT | ON-PLUG | COLD | WARM TO HOT | FIRST POSITION | FLOW-PERMITTING |

FIG.6

BATTERY PACK THERMAL MANAGEMENT

CROSS-REFERENCE TO RELATED APPLICATIONS

This application is a continuation of U.S. patent application Ser. No. 14/537,243, which was filed on 10 Nov. 2014 and is incorporated herein by reference.

TECHNICAL FIELD

This disclosure is directed toward managing thermal energy within a battery pack and, more particularly, to actively managing thermal energy using a flow of air that has passed through an engine compartment of an electrified vehicle.

BACKGROUND

Generally, electrified vehicles differ from conventional motor vehicles because electrified vehicles are selectively driven using one or more battery-powered electric machines. Conventional motor vehicles, by contrast, rely exclusively on an internal combustion engine to drive the vehicle. Electrified vehicles may use electric machines instead of, or in addition to, the internal combustion engine.

Example electrified vehicles include hybrid electric vehicles (HEVs), plug-in hybrid electric vehicles (PHEVs), fuel cell vehicles, and battery electric vehicles (BEVs). A powertrain of an electrified vehicle is typically equipped with a battery pack having battery cells that store electric power for powering the electric machines.

Maintaining battery cell temperatures within optimal operating ranges can require active thermal management.

SUMMARY

An assembly according to an exemplary aspect of the present disclosure includes, among other things, a blend door positioned on an underside of an electrified vehicle and moveable between a first position and a second position. The blend door in the first position permits a first flow of air to move toward a traction battery. The blend door in the second position permits a second flow of air to move toward the traction battery. The first flow includes more air that has moved through an engine compartment than the second flow. The second flow includes at least some air that has not moved through the engine compartment.

In a further non-limiting embodiment of the foregoing assembly, the blend door is pivotable, and the blend door is pivotable to an orientation where the blend door is entirely vertically below the traction battery of the electrified vehicle.

In a further non-limiting embodiment of any of the foregoing assemblies, the blend door is selectively moveable to an orientation where the blend door is aligned with an aero-shield of the electrified vehicle, and to an orientation where the blend door is misaligned with the aero-shield, wherein the aero-shield is below the traction battery.

A further non-limiting embodiment of any of the foregoing assemblies includes a blocker door separate from the blend door. The blocker door is moveable between a flow-blocking position and a flow-permitting position. The blocker door in the flow-blocking position blocks the traction battery from receiving the first flow or the second flow. The blocker door in the flow-permitting position permits the traction battery to receive the first flow or the second flow. The blend door is closer to a front of the electrified vehicle than the blocker door.

In a further non-limiting embodiment of any of the foregoing assemblies, the second flow includes more ram air from outside the engine compartment than the first flow. The ram air from outside the engine compartment enters the electrified vehicle at a position rearward an axle of the electrified vehicle.

In a further non-limiting embodiment of any of the foregoing assemblies, the first flow comprises, exclusively, ram air that has moved through the engine compartment and that has entered the electrified vehicle at a position in front of a forward axle of the electrified vehicle.

In a further non-limiting embodiment of any of the foregoing assemblies, both the first flow of air and the second flow of air comprise ram air, and the engine compartment holds an internal combustion engine.

An assembly according to another exemplary aspect of the present disclosure includes, among other things, a blend structure moveable between a first position and a second position to adjust thermal energy levels in a battery pack positioned outside an engine compartment. In the first position, the blend structure directly blocks ram air from entering a hybrid electric vehicle, and permits a flow of air from the engine compartment. In the second position, the blend structure permits ram air to enter the hybrid electric vehicle.

In a further non-limiting embodiment of the foregoing assembly, the ram air permitted by the blend structure in the second position has not passed through the engine compartment.

In a further non-limiting embodiment of any of the foregoing assemblies, the blend structure is exposed to ram air that is outside the vehicle when the blend structure is in the first position.

An assembly according to yet another exemplary aspect of the present disclosure includes, among other things, a traction battery of an electrified vehicle, and a blend door moveable between a first position that permits a first flow of air to move toward the traction battery and a second position that permits a second flow of air to move toward the traction battery. The first flow includes more air that has moved through an engine compartment than the second flow.

In a further non-limiting embodiment of the foregoing assembly, the blend door is pivotable between the first position and the second position.

In a further non-limiting embodiment of any of the foregoing assemblies, the blend door is disposed on an underside of the electrified vehicle, and the blend door is moveable to an orientation where the blend door is entirely vertically below the traction battery.

In a further non-limiting embodiment of any of the foregoing assemblies, the traction battery is disposed on an underside of the electrified vehicle outside of the engine compartment.

In a further non-limiting embodiment of any of the foregoing assemblies, the traction battery is disposed vertically below a passenger compartment of the electrified vehicle.

In a further non-limiting embodiment of any of the foregoing assemblies, the second flow includes at least some air that has not moved through the engine compartment.

A further non-limiting embodiment of any of the foregoing assemblies includes a blocker door moveable between a flow-blocking position and a flow-permitting position. The blocker door in the flow-blocking position blocks the traction battery pack from receiving the first flow or the second flow. The blocker door in the flow-permitting position permits the traction battery pack to receive the first flow or the second flow.

In a further non-limiting embodiment of any of the foregoing assemblies, the blend door is closer to a front of the electrified vehicle than the blocker door.

In a further non-limiting embodiment of any of the foregoing assemblies, the blend door is disposed on an underside of the electrified vehicle, and the blend door is moveable to an orientation wherein the blend door is entirely vertically below the traction battery.

In a further non-limiting embodiment of any of the foregoing assemblies, the traction battery is disposed on an underside of the electrified vehicle outside of an engine compartment of the electrified vehicle.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DESCRIPTION OF THE FIGURES

The various features and advantages of the disclosed examples will become apparent to those skilled in the art from the detailed description. The figures that accompany the detailed description can be briefly described as follows:

FIG. 6 shows a table of positions for the blend door and the blocker door corresponding to various condition sets of the example electrified vehicle of FIG. 2.

DETAILED DESCRIPTION

Many electrified vehicles utilize active thermal management techniques to maintain battery cells, and other portions of a battery pack, at optimal temperatures.

This disclosure is directed toward active thermal management of a battery pack. A thermal energy level of the battery pack is actively managed using a flow of air that has moved through the engine compartment, a flow of air that has not moved through the engine compartment, or some combination of these.

Figure 1:
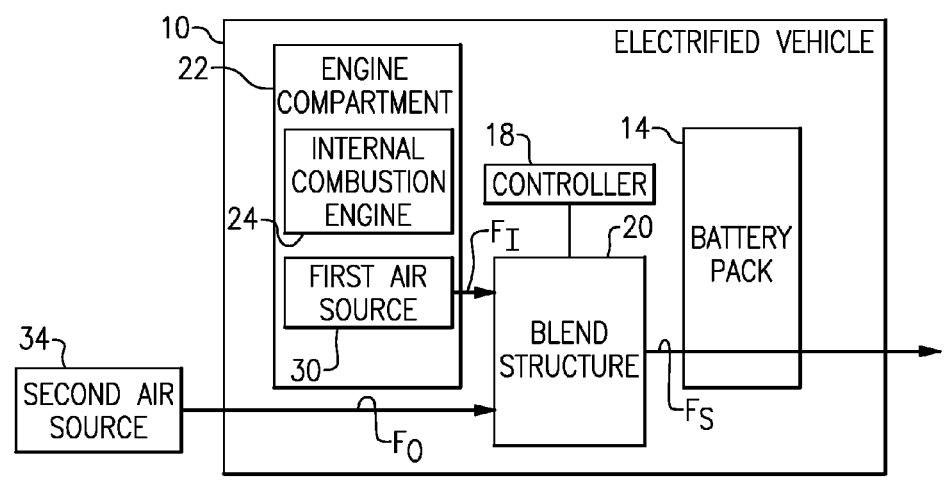
FIG. 1 illustrates a high level schematic view of an example electrified vehicle having a battery pack that is actively thermal managed.

Referring to FIG. 1, an electrified vehicle 10 includes a battery pack 14, a controller 18, and a blend structure 20. An engine compartment 22 is provided within the electrified vehicle 10. The engine compartment 22 houses an internal combustion engine 24.

In this example, the electrified vehicle 10 is a hybrid electric vehicle (HEV). The powertrain includes a motor, a generator, the internal combustion engine 24, and the battery pack 14. The motor and generator may be separate or have the form of a combined motor generator.

The powertrain may utilize a first drive system that includes a combination of the engine 24 and the generator, or a second drive system that includes at least the motor, generator, and the battery pack 14. Power stored within the battery pack 14 is used to power the motor, the generator, or both.

Although the example electrified vehicle 10 is described as a HEV, the teachings of this disclosure could be applied to other types of electrified vehicles, such as battery electric vehicles BEVs, and other electrified vehicles incorporating a battery pack.

The engine compartment 22 is defined within the electrified vehicle 10. Generally, the engine compartment 22 is a cavity provided by the vehicle 10 that houses the internal combustion engine 24. In this example, the engine compartment 22 is forward the battery pack 14 relative to a forward direction of travel for the electrified vehicle 10.

In this example, the air within the engine compartment 22 is a first air source 30, and the air outside the engine compartment 22 is a second air source 34.

The internal combustion engine 24 can have thermal energy that causes air within the engine compartment 22 to increase in temperature relative to air outside the engine compartment 22. Thus, air from the first air source 30 is relatively hotter than air from the second air source 34.

A flow $F_I$ of air from the first air source 30 and a flow $F_o$ of air from the second air source 34 can both move to the blend structure 20. The controller 18 manipulates the blend structure 20 such that a flow $F_S$ from the blend structure 20 is the flow $F_I$ of air from the first air source 30, the flow $F_o$ of air from the second air source 34, or some combination of the flow $F_I$ and the flow $F_O$.

Because of differences in temperature between the flow $F_I$ and the flow $F_O$, the temperature of the flow $F_S$ can change based on how the controller 18 manipulates the blend structure 20. Allowing more of the flow $F_I$ increases the temperature of the flow $F_S$, for example.

The example controller 18 is a Battery Energy Control Module (BECM). While schematically illustrated as a single module in the illustrated embodiment, the controller 18 may be part of a larger control system and may be controlled by various other controllers throughout the 10 electrified vehicle, such as a vehicle system controller (VSC) that includes a powertrain control unit, a transmission control unit, an engine control unit, BECM, etc.

The flow $F_S$ moves near the battery pack 14, through the battery pack 14, or both. For example, the flow $F_S$ may move through or across a heat exchanger that is near the battery pack 14, such as a cooling plate. The flow $F_S$ can cause the battery pack 14 to heat up or cool down depending on, among other things, the temperature of the flow $F_S$ relative to the temperature of the battery pack 14, and the speed of the flow $F_S$.

Figure 2:
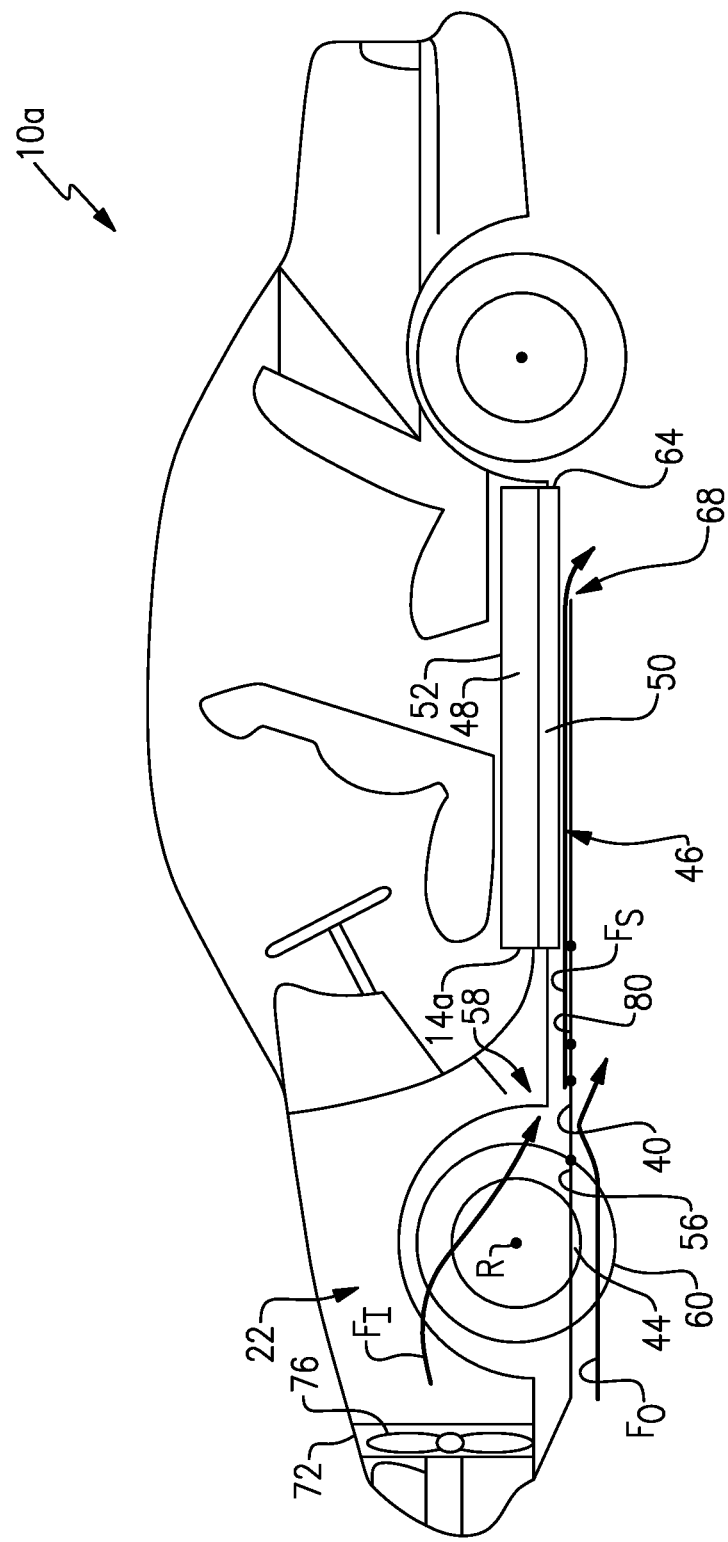
FIG. 2 illustrates an embodiment of the electrified vehicle of FIG. 1 with the battery pack thermally managed using a blend door and air that has moved through an engine compartment of the electrified vehicle.
Figure 3:
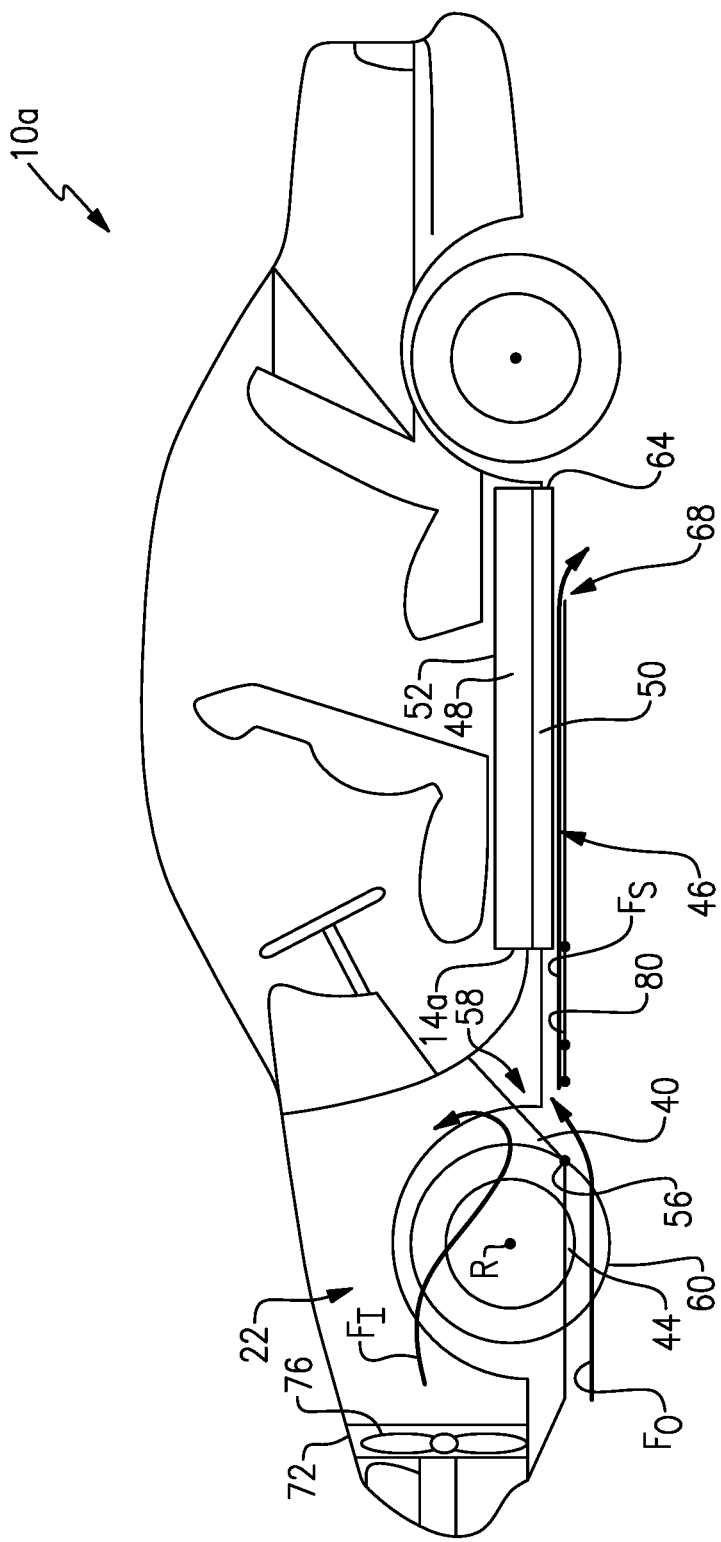
FIG. 3 illustrates the electrified vehicle of FIG. 2 with the battery pack thermally managed using the blend door and air that has not moved through the engine compartment of the electrified vehicle.

Referring now to FIGS. 2 and 3 with continuing reference to FIG. 1, a blend door 40 is the blend structure 20 of an example electrified vehicle 10a. The controller 18 is configured to actuate the blend door 40 between the first position of FIG. 2 and the second position of FIG. 3.

In other examples, shutters or deflectors could provide the blend structure 20. The blend door 40 may include one or more individual doors. The blend door 40 could be on a side or the sides of the vehicle 10a rather than the underside.

The vehicle 10a includes an aero-shield 44 that protects an example battery pack 14a. The aero-shield 44 is located on an underside of the vehicle 10a. The battery pack 14a is positioned beneath a passenger compartment of the vehicle 10a. The aero-shield 44 is spaced from the battery pack 14a to provide a channel 46 between the aero-shield 44 and the battery pack 14a.

The example battery pack 14a includes a plurality of battery cells 48 disposed on a heat sink 50. A housing 52 contains the battery cells 48 and the heat sink 50. The channel 46 extends beneath the battery pack 14a and is at least partially provided by the housing 52. The example channel 46 is closer to the heat sink 50 than the battery cells 48.

In another example, some or all of the channel 46 may be extend through the battery pack 14a and be provided by portions of the battery pack 14a within the housing 52.

The blend door 40 is aligned with the aero-shield 44 of the electrified vehicle 10a when the blend door 40 is in the first position. The blend door 40 is misaligned with the aero-shield 44 when the blend door is in the second position.

The blend door 40 pivots about an axis 56 when moving between the first position and the second position. The axis 56 is generally aligned with a rotational axis R of a set of drive wheels 60 for the electrified vehicle 10a.

When the blend door 40 is in the first position of FIG. 2, the flow of air $F_I$ from the first air source 30 within the engine compartment 22 is free to move through an opening 58 to the channel 46. The blend door 40 in the first position blocks the flow of air $F_O$ from the second air source 34 outside the engine compartment 22 from moving through the opening 58 to the channel 46.

When the blend door 40 is in the second position of FIG. 3, the flow of air $F_O$ is free to move through an opening 58 to the channel 46. The blend door 40 in the second position blocks the flow of air $F_I$ from entering the opening 58.

After moving through the opening 58, the flow moves through the channel 46 as the flow $F_S$. The channel 46 extends beneath the battery pack 14a, the flow $F_S$ moves beneath the battery pack 14a when moving through the channel 46.

The flow $F_S$ exits the channel 46 at an opening 68 where the flow is communicated to an environment surrounding the electrified vehicle 10a.

In this example, the flow $F_S$ of air moving through the channel 46 is used to adjust a thermal energy level of the battery pack 14a. The temperature of the flow $F_S$, and the speed at which the flow $F_S$ moves through the channel 46, can influence whether the flow $F_S$ adds thermal energy to the battery pack 14a or carries thermal energy from the battery pack 14a. For example, if the flow $F_S$ is warm relative to the battery pack 14a, the flow $F_S$ can carry thermal energy to the battery pack 14a to heat the battery pack 14a.

In this example, air enters the engine compartment 22 through a radiator 72. The flow $F_O$ has not moved through the engine compartment 22 or through the radiator 72. The flow of air $F_I$ differs from the flow of air $F_O$ because, among other things, the flow of air $F_I$ has moved through at least a portion of the engine compartment 22. Moving air through the engine compartment 22 can heat the air such that the flow $F_I$ is heated relative to the flow $F_O$. Various components can heat the air $F_I$, such as the internal combustion engine 24 within the engine compartment 22.

When the blend door 40 is in the first position, the flows $F_I$ can be forced into the opening 58 due to forward movement of the vehicle 10a if the vehicle 10a is moving. When the blend door 40 is in the second position, the flows $F_O$ can be forced into the opening 58 due to forward movement of the vehicle 10a. Forward movement of the vehicle 10a can further cause the flow $F_S$ to move through the channel 46. If movement of the vehicle 10a is causing the flows $F_I$, $F_O$, and $F_S$ of air to move, the flows $F_I$, $F_O$, and $F_S$ can be considered flows of ram air.

A component, such as a fan 76 of the radiator 72, may be used to move the flow $F_I$ through the opening 58. The fan 76 may be used when the vehicle 10a is stationary or when the vehicle 10a is moving. If the fan 76 is exclusively used to move the flow $F_I$, the flow $F_I$ is not considered a flow of ram air.

In some examples, such as during a start cycle in a cold environment, heating the battery pack 14a is desirable. Heating the battery pack 14a can increase efficiencies, such as fuel efficiencies, etc.

To heat the battery pack 14a, the controller 18 can adjust the blend door 40 to the position of FIG. 2 to provide a path for the flow of air $F_I$ to move through the opening 58. The flow $F_I$ is heated within the engine compartment 22 and is heated relative to the flow $F_O$. The flow $F_I$ of air moves through the opening 58 into the channel 46 as the flow $F_S$. The flow $F_S$ then adds thermal energy to the battery pack 14a as the flow $F_S$ moves through the channel 46.

In some examples, such as when driving the vehicle 10a in a hot environment, cooling the battery pack 14a is desirable. Cooling the battery pack 14a can increase efficiencies, such as fuel efficiencies, etc.

To cool the battery pack 14a, the controller 18 adjusts the blend door 40 to the position of FIG. 3 to provide a path for a flow of air $F_O$ to move through the opening 58. Moving the blend door 40 to the position of FIG. 3 causes the flow $F_O$ of air to move through the opening 58 into the channel 46 as the flow $F_S$. Because the flow $F_O$ is cool relative to the flow $F_I$, the flow $F_O$ may more effectively carry thermal energy from the battery pack 14a than if the flow $F_I$ were permitted to move through the opening 58 into the channel 46.

The example blend door 40 is shown in FIGS. 2 and 3 as providing either flow $F_I$ or flow $F_O$ to the channel 46. In other examples, the blend door 40 or another blend structure 20 may be moved to intermediate positions between the first position of FIG. 2 and the second position of FIG. 3. The blend door 40 in the intermediate positions permit some combination of flows $F_I$ and $F_O$ to pass through the opening 58 and enter the channel 46. The controller 18 may make the positional adjustment to the blend door 40 in response to a particular environmental condition and to cause the flow $F_S$ to have a particular temperature or be within a certain range of temperatures.

The example controller 18 adjusts the blend door 40 in response to a temperature. In some examples, the temperature is a temperature of the battery pack 14a. In other examples, the temperature comprises further a temperature of the surrounding environment.

The controller 18 may rely on pneumatic, electromechanical, or some other type of controllable actuator to move the blend door 40 between the first position and the second position.

Figure 4:
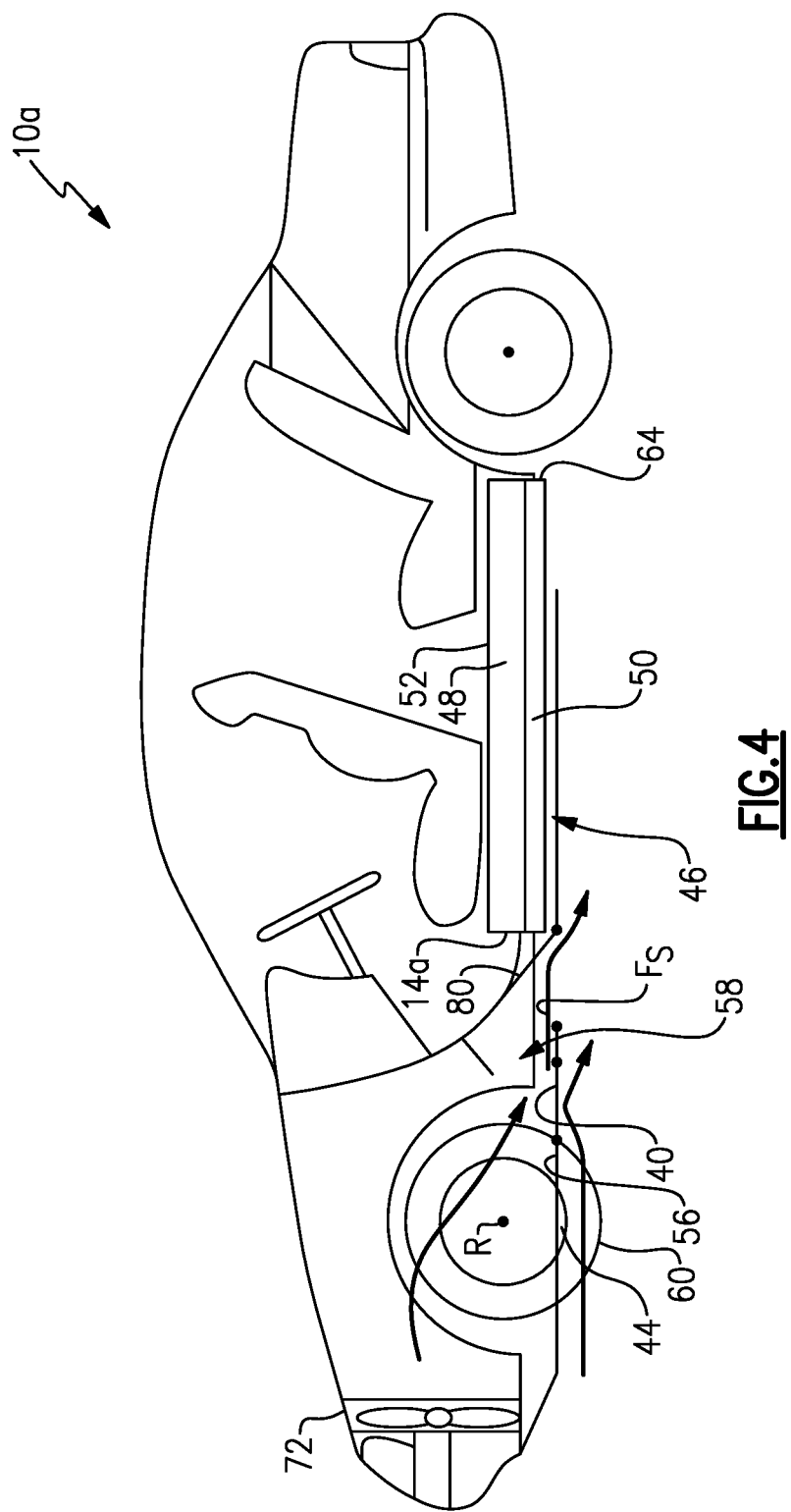
FIG. 4 illustrates the electrified vehicle of FIG. 2 showing a blocker door limiting thermal management of the battery pack using air that has moved through the engine compartment of the electrified vehicle.
Figure 5:
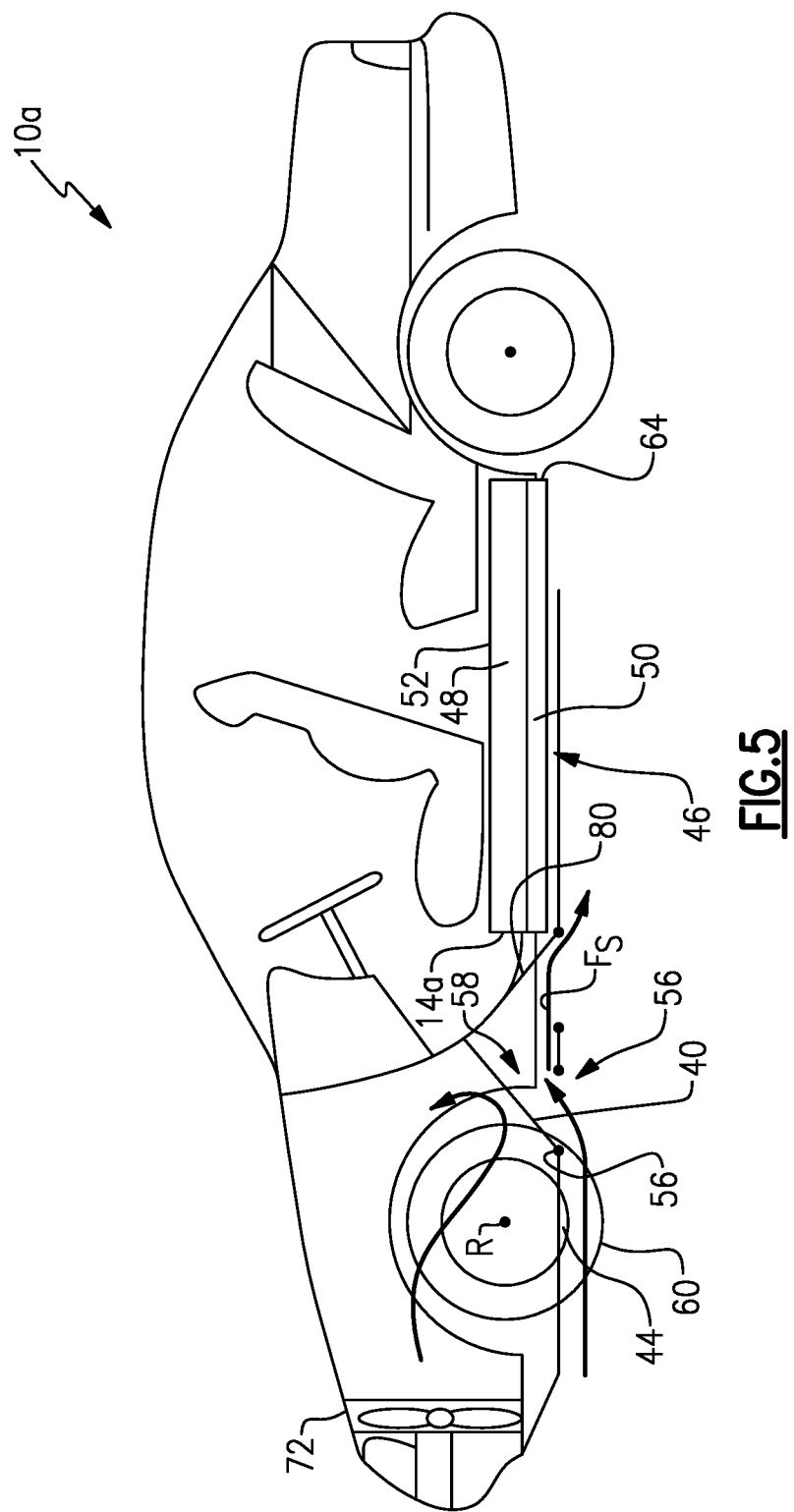
FIG. 5 illustrates the electrified vehicle of FIG. 2 showing the blocker door limiting thermal management of the battery pack using air that has not moved through the engine compartment of the electrified vehicle.

Referring now to FIGS. 4 and 5, the example electrified vehicle 10a further includes a blocker door 80. The blocker door 80 can be moved to a flow-blocking position shown in FIGS. 4 and 5 from a flow-permitting position that is shown in FIGS. 2 and 3. When the example blocker door 80 is in the flow-blocking position, the blocker door 80 redirects flow away from the battery 14a. Other examples of the electrified vehicle 10a do not include the blocker door 80.

When the blocker door 80 is in the flow-blocking position of FIGS. 4 and 5, the flows $F_I$ and $F_O$ are free to move through the opening 58 to the channel 46 depending on the position of the blend door 40. When the blocker door 80 is in the flow-blocking position, the flows $F_I$ and $F_O$ are blocked from entering the channel 46.

The blocker door 80 is misaligned with the aero-shield 44 of the electrified vehicle 10a when the blocker door 80 is in the flow-blocking position of FIGS. 4 and 5. The blend door 40 is aligned with the aero-shield 44 when the blend door is in the flow-permitting position of FIGS. 2 and 3.

Referring to FIG. 6, with reference to FIGS. 1 to 5, a Table shows various combinations of positions for the blend door 40 and the blocker door 80 in response to particular conditions sets. In this example, the conditions include weather conditions, drive cycle styles, engine temperatures, whether the vehicle is being driven or is parked, and battery temperatures. The controller 18 may apply logic similar to that set forth in the Table to position the blend door, the blocker door, or both.

If the controller 18 adjusts the blend door 40 and the blocker door 80 according to the Table in response to Condition Set I, the flow $F_I$ moves through the opening 58 to the channel 46.

If the controller 18 adjusts the blend door 40 and the blocker door 80 according to the Table in response to Condition Set II, the flow $F_I$ moves through the opening 58 to the channel 46 to help keep battery pack 14a above power limits for low temperatures.

If the controller 18 adjusts the blend door 40 and the blocker door 80 according to the Table in response to Condition Set III, the flow $F_I$ can move through the opening 58 to the channel 46. The flow can be a mix of flow from the engine compartment and flow from outside the engine compartment.

Notably, the blend door 40, when in the intermediate position, is regulated to the first position, the second position, or a position between the first position and the second position in response to a desired temperature.

If the controller 18 adjusts the blend door 40 and the blocker door 80 according to the Table in response to Condition Set IV, the flow $F_I$ can move through the opening 58 to the channel 46, but the blocker door 80 redirects the flow $F_I$ away from the battery. When adjusted to according to Condition Set IV, little to no air circulates around battery pack 14a, which speeds up self-heating of the battery pack 14a.

If the controller 18 adjusts the blend door 40 and the blocker door 80 according to the Table in response to Condition Set V, the vehicle 10a is parked and little to no air moves through the channel 46, which can enhance self-warm up of the battery pack 14a.

If the controller 18 adjusts the blend door 40 and the blocker door 80 according to the Table in response to Condition Set VI, little to no air moves through the channel 46, which helps the battery pack 14a retain thermal energy.

If the controller 18 adjusts the blend door 40 and the blocker door 80 according to the Table in response to Condition Set VII, the radiator fan 76 can be used to force the flow $F_I$ to move through the opening 58 to the channel 46 to warm the battery pack 14a.

If the controller 18 adjusts the blend door 40 and the blocker door 80 according to the Table in response to Condition Set VIII, cooling of the battery pack 14a can be regulated using the blocker door 80 to selectively permit flow $F_S$ through the channel 46.

If the controller 18 adjusts the blend door 40 and the blocker door 80 according to the Table in response to Condition Set IX, flow $F_O$ moves through channel 46 as the flow $F_S$.

If the controller 18 adjusts the blend door 40 and the blocker door 80 according to the Table in response to Condition Set X, the blend door 40 can be moved an intermediate position, and the blocker door 80 can be moved to an intermediate position to regulate the flow $F_S$ and the temperature of the battery pack 14a.

Notably, the blocker door 80, when in the intermediate position, is regulated to the flow-permitting position, the flow-blocking position, or a position between the flow-permitting position and the flow-blocking position in response to a desired temperature.

If the controller 18 adjusts the blend door 40 and the blocker door 80 according to the Table in response to Condition Set XI, flow $F_O$ moves through channel 46 as the flow $F_S$ to cool the battery pack 14a.

If the controller 18 adjusts the blend door 40 and the blocker door 80 according to the Table in response to Condition Set XII, the radiator fan 76 can be used to force the flow $F_I$ to move through the opening 58 to the channel 46 to cool the battery pack 14a when the battery pack 14a is being charged and the vehicle 10a is stationary. Moving the flow $F_I$ through the channel 46 when the battery pack 14a is stationary helps to avoid overheating the battery pack 14a due to self-heating during charging.

Features of the disclosed embodiments include an active thermal management approach for a battery pack. Thermal management can save energy, improve fuel economy, and improve performance. Thermal management can maintain the battery pack within an optimal range of operating temperatures.

While various features and aspects are described above in connection with one or more particular embodiments, those features and aspects are not necessarily exclusive to the corresponding embodiment. The disclosed features and aspects may be combined in other ways than those specifically mentioned above. In other words, any feature of one embodiment may be included with another embodiment or substituted for a feature of another embodiment.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. An assembly, comprising:
a blend door positioned on an underside of an electrified vehicle and moveable between a first position and a second position, the blend door in the first position permitting a first flow of air to move toward a traction battery, the blend door in the second position permitting a second flow of air to move toward the traction battery, the first flow including more air that has moved through an engine compartment than the second flow, the second flow including at least some air that has not moved through the engine compartment; and
a blocker door separate from the blend door, the blocker door moveable between a flow-blocking position and a flow-permitting position, the blocker door in the flow-blocking position blocking the traction battery from receiving the first flow or the second flow, the blocker door in the flow-permitting position permitting the traction battery to receive the first flow or the second flow, wherein the blend door is closer to a front of the electrified vehicle than the blocker door.

2. The assembly of claim 1, wherein the blend door is pivotable, and the blend door is pivotable to an orientation where the blend door is entirely vertically below the traction battery of the electrified vehicle.

3. The assembly of claim 1, wherein the blend door is selectively moveable to an orientation where the blend door is aligned with an aero-shield of the electrified vehicle, and to an orientation where the blend door is misaligned with the aero-shield, wherein the aero-shield is below the traction battery.

4. The assembly of claim 1, wherein the second flow includes more ram air from outside the engine compartment than the first flow, the ram air from outside the engine compartment entering the electrified vehicle at a position rearward an axle of the electrified vehicle.

5. The assembly of claim 4, wherein the first flow comprises, exclusively, ram air that has moved through the engine compartment and that has entered the electrified vehicle at a position in front of a forward axle of the electrified vehicle.

6. The assembly of claim 1, wherein both the first flow of air and the second flow of air comprise ram air, and the engine compartment holds an internal combustion engine.

7. An assembly, comprising:
a traction battery of an electrified vehicle; and
a blend door moveable between a first position that permits a first flow of air to move toward the traction battery and a second position that permits a second flow of air to move toward the traction battery, the first flow including more air that has moved through an engine compartment than the second flow; and
a blocker door moveable between a flow-blocking position and a flow-permitting position, the blocker door in the flow-blocking position blocking the traction battery pack from receiving the first flow or the second flow, the blocker door in the flow-permitting position permitting the traction battery pack to receive the first flow or the second flow.

8. The assembly of claim 7, wherein the blend door is pivotable between the first position and the second position.

9. The assembly of claim 7, wherein the blend door is disposed on an underside of the electrified vehicle, and the blend door is moveable to an orientation where the blend door is entirely vertically below the traction battery.

10. The assembly of claim 7, wherein the traction battery is disposed on an underside of the electrified vehicle outside of the engine compartment.

11. The assembly of claim 7, wherein the traction battery is disposed vertically below a passenger compartment of the electrified vehicle.

12. The assembly of claim 7, wherein the second flow includes at least some air that has not moved through the engine compartment.

13. The assembly of claim 7, wherein the blend door is closer to a front of the electrified vehicle than the blocker door.

* * * * *